United States Patent [19]
Yamamoto

[11] Patent Number: 6,151,372
[45] Date of Patent: Nov. 21, 2000

[54] DIVERSITY RECEIVER

[75] Inventor: Takeshi Yamamoto, Tokyo, Japan

[73] Assignee: NEC Corporation, Tokyo, Japan

[21] Appl. No.: 09/353,381

[22] Filed: Jul. 15, 1999

[30] Foreign Application Priority Data

Jul. 21, 1998 [JP] Japan ................... 10-205305

[51] Int. Cl.⁷ ................. H04B 7/10; H04L 1/02
[52] U.S. Cl. .................. 375/347; 375/267; 455/137; 455/134
[58] Field of Search .................... 375/347, 349, 375/267; 455/132, 133, 134, 137, 273, 277.1, 277.2

[56] References Cited

U.S. PATENT DOCUMENTS

| | | | |
|---|---|---|---|
| 5,481,570 | 1/1996 | Winters | 375/347 |
| 5,621,752 | 4/1997 | Antonio et al. | 375/200 |
| 5,933,446 | 8/1999 | Bond et al. | 375/130 |

FOREIGN PATENT DOCUMENTS

| | | |
|---|---|---|
| 6-232793 | 8/1994 | Japan . |
| 6-326739 | 11/1994 | Japan . |
| 7-273741 | 10/1995 | Japan . |
| 9-214465 | 8/1997 | Japan . |
| 9-284191 | 10/1997 | Japan . |

Primary Examiner—Don N. Vo
Assistant Examiner—Phuong Phu
Attorney, Agent, or Firm—Sughrue, Mion, Zinn, Macpeak & Seas, PLLC

[57] ABSTRACT

A diversity receiver is disclosed with an object to improve deteriorated transmission due to fading even when frequency selective fading resulting from multipaths occurs in a propagation path. The diversity receiver is provided with two lines, each line comprising an antenna, an orthogonal detector, first sampling and quantizing means, second sampling and quantizing means, a serial-parallel conversion circuit, and a Fourier transform circuit. In each of the lines, a modulated signal transmitted from a transmitter is received and processed. In a diversity processing unit, optimal diversity processing for each subcarrier is performed using the received and processed signals in respective lines. In this manner, an improvement is made in deteriorated transmission quality due to multipath fading between the receiver and the transmitter for transmitting OFDM modulated signals.

11 Claims, 3 Drawing Sheets

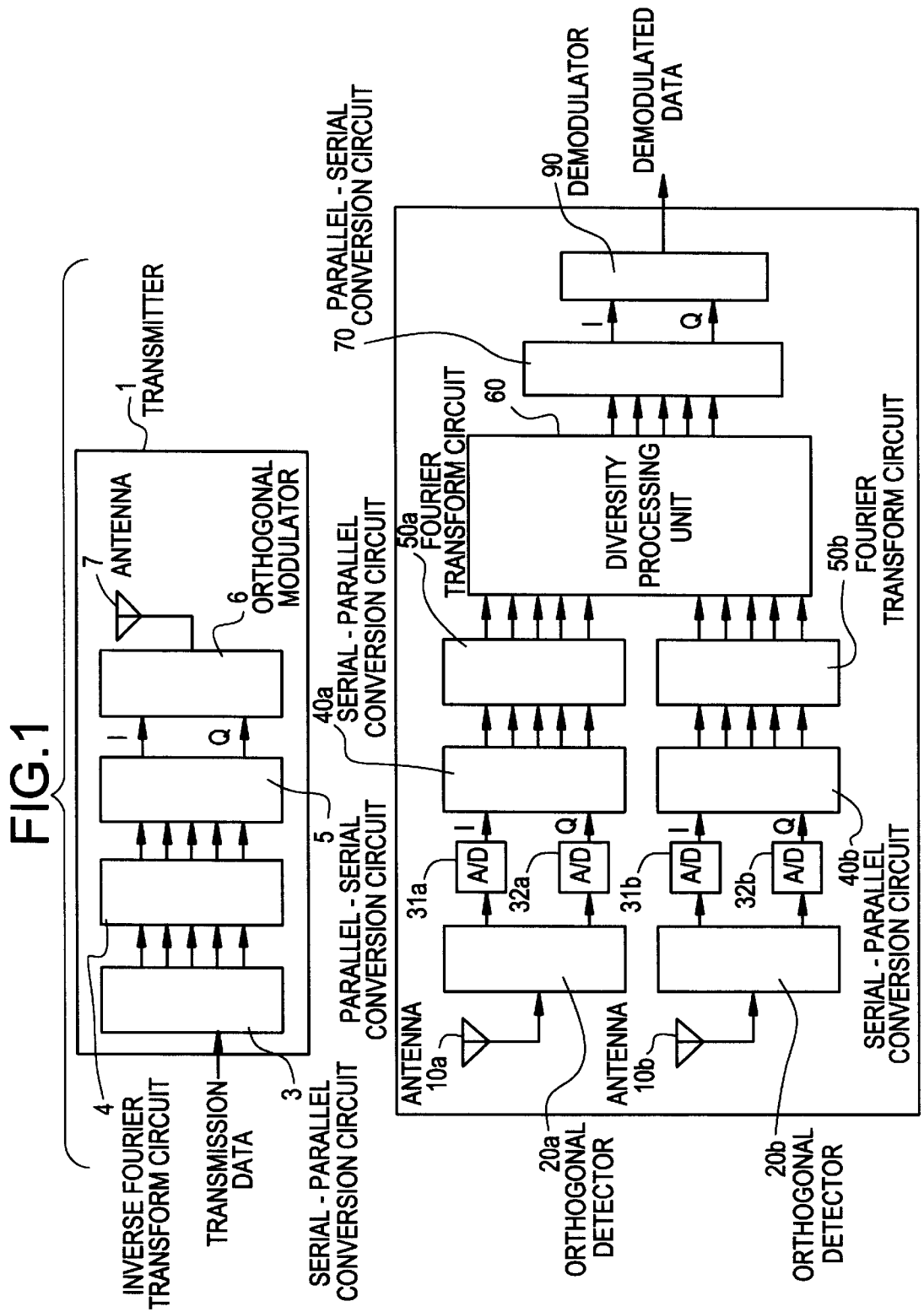

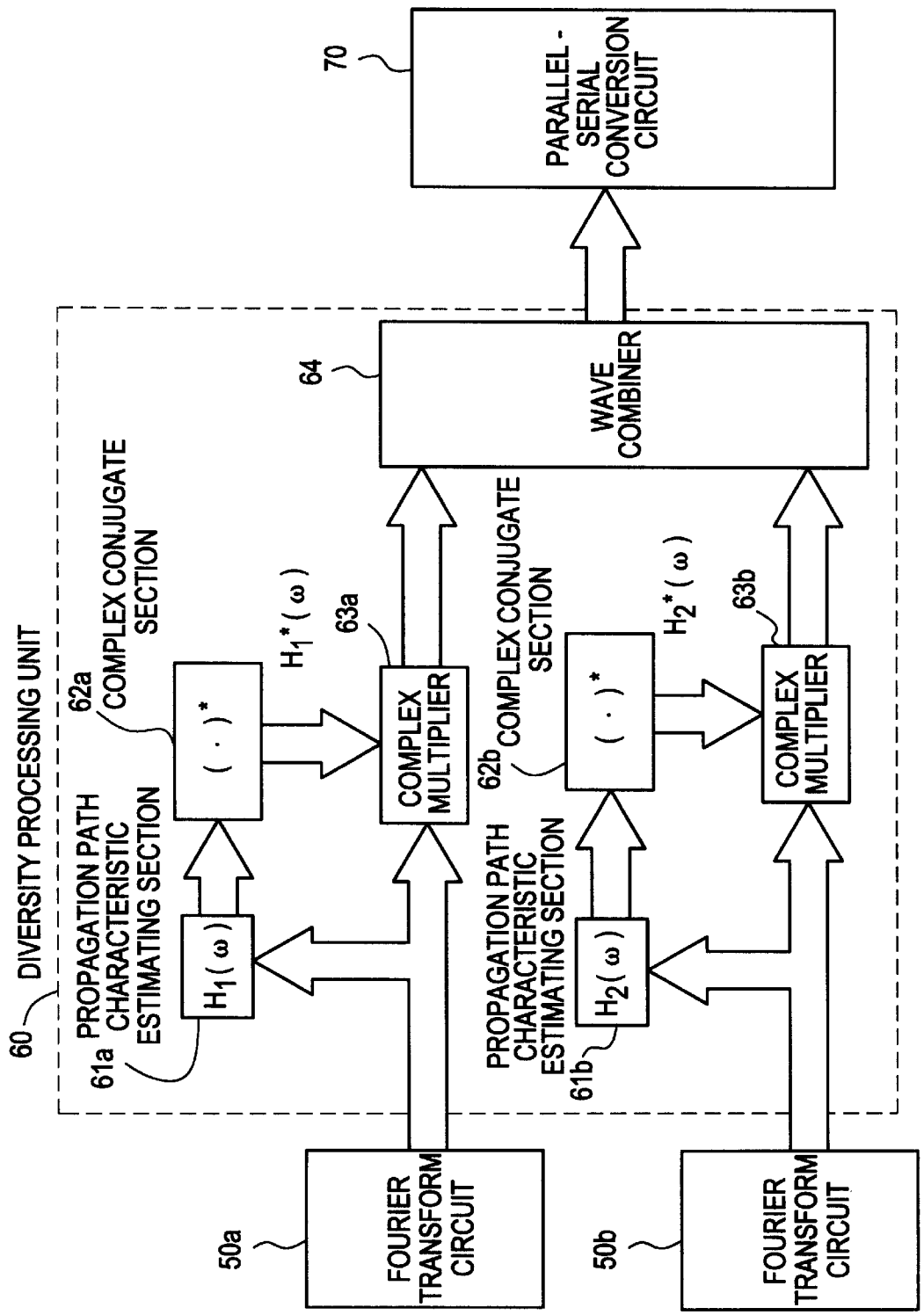

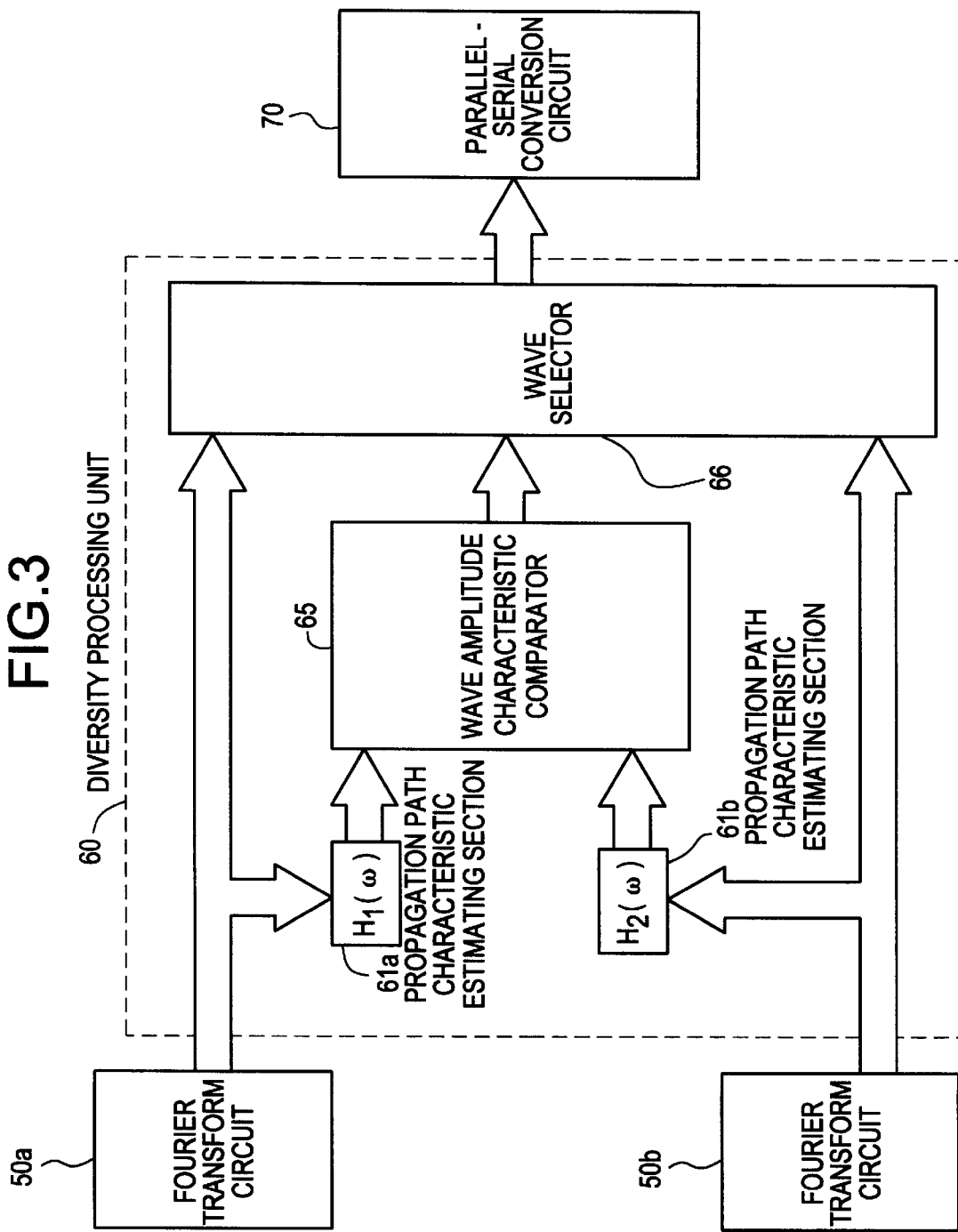

DIVERSITY RECEIVER

BACKGROUND OF THE INVENTION

1. Field of the Invention

The present invention relates to a diversity receiver, and more particularly to a diversity receiver used in a radio communication system for transmitting orthogonal frequency division multiplexed (hereinafter referred to as OFDM) modulated signals.

2. Description of the Related Art

Conventionally, diversity receivers used in a radio communication system for transmitting OFDM modulated signals perform diversity processing in time domains. For this reason, when deteriorated transmission quality due to fading generated in a transmission path is to be improved, multiple multicarrier signals are collectively handled.

In the aforementioned diversity receiver, since multiple multicarrier signals are collectively handled when deteriorated transmission due to fading is to be improved, optimal processing can not be performed for each subcarrier if frequency selective fading resulting from multipaths is generated in a propagation path, thereby having a disadvantage that it is difficult to improve deteriorated transmission due to frequency selective fading resulting from multipaths.

SUMMARY OF THE INVENTION

It is an object of the present invention to provide a diversity receiver capable of improving deteriorated transmission due to fading even when frequency selective fading resulting from multipaths is generated in a propagation path.

In the present invention, two lines are provided, each line comprising an antenna, an orthogonal detector, first sampling and quantizing means, second sampling and quantizing means, a serial-parallel conversion circuit, and a Fourier transform circuit. In each of the lines, a modulated signal transmitted from a transmitter is received and processed. In a diversity processing unit, optimal diversity processing for each subcarrier is performed using the received and processed signals in respective lines.

In this manner, an improvement is made in deteriorated transmission quality due to multipath fading between the receiver and the transmitter for transmitting OFDM modulated signals.

Additionally, diversity processing is performed with digital processing to readily realize a reduction in size associated with LSI and eliminate the need for adjustment.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 1 is a diagram showing an embodiment of a radio communication system which uses a diversity receiver according to the present invention;

FIG. 2 is a diagram showing an example of configuration of a diversity processing unit shown in FIG. 1; and FIG. 3 is a diagram showing another example of configuration of the diversity processing unit shown in FIG. 1.

DETAILED DESCRIPTION OF THE PREFERRED EMBODIMENTS

An embodiment of a radio communication system which uses a diversity receiver according to the present invention will be hereinafter described.

The radio communication system of the embodiment comprises transmitter 1 and diversity receiver 2 as shown in FIG. 1.

Transmitter 1 comprises serial-parallel conversion circuit 3 for serial-parallel converting data to be transmitted to diversity receiver 2; inverse Fourier transform circuit 4 for inversely Fourier transforming the transmission data serial-parallel converted at serial-parallel conversion circuit 3; parallel-serial conversion circuit 5 for parallel-serial converting the transmission data inversely Fourier transformed at inverse Fourier transform circuit 4 to generate I, Q signals in time series; orthogonal modulator 6 for orthogonal modulating the I, Q signals generated at parallel-serial conversion circuit 5 to output the modulated signal as OFDM modulated signal; and antenna 7 for transmitting the OFDM modulated signal provided from orthogonal modulator 6 to diversity receiver 2.

Diversity receiver 2, in turn, comprises antennas 10a, 10b for receiving the OFDM modulated signal transmitted from transmitter 1; orthogonal detectors 20a, 20b for converting the OFDM modulated signal received through antennas 10a, 10b into two respective analogue complex baseband signals which are orthogonal to each other to provide the converted signals; A/D converter 31a serving as first sampling and quantizing means for sampling and quantizing one of the analogue complex baseband signals provided from orthogonal detector 20a to generate a sampled and quantized I signal; A/D converter 32a serving as second sampling and quantizing means for sampling and quantizing the other of the analogue complex baseband signals provided from orthogonal detector 20a to generate a sampled and quantized Q signal; A/D converter 31b serving as first sampling and quantizing means for sampling and quantizing one of the analogue complex baseband signals provided from orthogonal detector 20b to generate a sampled and quantized I signal; A/D converter 32b serving as second sampling and quantizing means for sampling and quantizing the other of the analogue complex baseband signals provided from orthogonal detector 20b to generate a sampled and quantized Q signal; serial-parallel conversion circuit 40a for serial-parallel converting the baseband signals sampled and quantized at A/D converters 31a, 32a; serial-parallel conversion circuit 40b for serial-parallel converting the baseband signals sampled and quantized at A/D converters 31b, 32b; Fourier transform circuits 50a, 50b for Fourier transforming the baseband signals serial-parallel converted at serial-parallel conversion circuits 40a, 40b respectively to separate the OFDM modulated signal transmitted from transmitter 1 into signals for each subcarrier which are outputted; diversity processing unit 60 for diversity processing the signals provided from Fourier conversion circuits 50a, 50b; parallel-serial conversion circuit 70 for parallel-serial converting the signal diversity processed at diversity processing unit 60 to generate I, Q signals in time series; and demodulator 90 for demodulating the I, Q signals generated at parallel-serial conversion circuit 70 to output the demodulated signal as demodulated data.

In the embodiment as mentioned above, two lines are provided from antennas 10a, 10b to Fourier transform circuits 50a, 50b in which the modulated signal transmitted from transmitter 1 is received and processed at the respective lines.

Referring to FIG. 2, there is shown an example of a configuration of diversity processing unit 60 shown in FIG. 1 comprising propagation path characteristic estimating section 61a for estimating propagation path characteristic $H_1(\omega)$ of a first propagation path based on the signals which have been Fourier transformed at Fourier transform circuit 50$a$ to be separated for each subcarrier and a known reference signal for estimating a propagation path characteristic which is periodically inserted into the signal transmitted from transmitter 1; complex conjugate section 62$a$ for generating $H_1^*(\omega)$, which is complex conjugate of propagation path characteristic $H_1(\omega)$ estimated at propagation path characteristic estimating section 61$a$; complex multiplier 63$a$ for complex multiplying the signals which have been Fourier transformed at Fourier transform circuit 50$a$ to be separated for each subcarrier by $H_1^*(\omega)$, which is the complex conjugate generated at complex conjugate section 62$a$; propagation path characteristic estimating section 61$b$ for estimating propagation path characteristic $H_2(\omega)$ of a second propagation path based on the signals which have been Fourier transformed at Fourier transform circuit 50$b$ to be separated for each subcarrier and a known reference signal for estimating a propagation path characteristic which is periodically inserted into the signal transmitted from transmitter 1; complex conjugate section 62$b$ for generating $H_2^*(\omega)$, which is complex conjugate of propagation path characteristic $H_2(\omega)$ estimated at propagation path characteristic estimating section 61$b$; complex multiplier 63$b$ for complex multiplying the signals which have been Fourier transformed at Fourier transform circuit 50$b$ to be separated for each subcarrier by $H_2^*(\omega)$, which is the complex conjugate generated at complex conjugate section 62$b$; and wave combiner 64 for combining the multiplication results at complex multipliers 63$a$, 63$b$ for each subcarrier to be provided to parallel-serial conversion circuit 70 as a diversity processed signal.

The operation of diversity receiver 2 configured as mentioned above will be hereinafter described.

When the OFDM modulated signal transmitted from transmitter 1 is received through antennas 10$a$, 10$b$, the OFDM modulated signal received through antennas 10$a$ is converted into two complex analogue baseband signals which are orthogonal to each other at orthogonal detector 20$a$ and the signal is outputted from orthogonal detector 20$a$, while the OFDM modulated signal received through antennas 10$b$ is converted into two complex analogue baseband signals which are orthogonal to each other at orthogonal detector 20$b$ and the signal is outputted from orthogonal detection 20$b$.

Next, the complex analogue baseband signal provided from orthogonal detector 20$a$ is sampled and quantized to generate a sampled and quantized I signal at A/D converter 31$a$. The analogue complex baseband signal provided from orthogonal detector 20$a$ is sampled and quantized to generate a sampled and quantized Q signal at A/D converter 32$a$.

The complex analogue baseband signal provided from orthogonal detector 20$b$ is sampled and quantized to generate a sampled and quantized I signal at A/D converter 31$b$. The analogue complex baseband signal provided from orthogonal detector 20$b$ is sampled and quantized to generate a sampled and quantized Q signal at A/D converter 32$b$.

Next, the baseband signals sampled and quantized at A/D converters 31$a$, 32$a$ are serial-parallel converted at serial-parallel conversion circuit 40$a$, and the baseband signals sampled and quantized at A/D converters 31$b$, 32$b$ are serial-parallel converted at serial-parallel conversion circuit 40$b$.

Next, the baseband signal serial-parallel converted at serial-parallel conversion circuit 40$a$ is Fourier transformed at Fourier transform circuit 50$a$ to separate the OFDM modulated signal transmitted from transmitter 1 into signals for each subcarrier. The baseband signal serial-parallel converted at serial-parallel conversion circuit 40$b$ is Fourier transformed at Fourier transform circuit 50$b$ to separate the OFDM modulated signal transmitted from transmitter 1 into signals for each subcarrier.

Thereafter, in propagation path characteristic estimating section 61$a$ in diversity processing unit 60, propagation path characteristic $H_1(\omega)$ of the first propagation path is estimated based on the signals which have been Fourier transformed at Fourier transform circuit 50$a$ to be separated for each subcarrier and a known reference signal for estimating a propagation path characteristic which is periodically inserted into the signal transmitted from transmitter 1.

Also, in propagation path characteristic estimating section 61$b$ in diversity processing unit 60, propagation path characteristic $H_2(\omega)$ of the second propagation path is estimated based on the signals which have been Fourier transformed at Fourier transform circuit 50$b$ to be separated for each subcarrier and a known reference signal for estimating a propagation path characteristic which is periodically inserted into the signal transmitted from transmitter 1.

Next, $H_1^*(\omega)$, which is complex conjugate of propagation path characteristic $H_1(\omega)$ estimated at propagation path characteristic estimating section 61$a$, is generated at complex conjugate section 62$a$, and $H_2^*(\omega)$, which is complex conjugate of propagation path characteristic $H_2(\omega)$ estimated at propagation path characteristic estimating section 61$b$, is generated at complex conjugate section 62$b$.

Next, at complex multiplier 63$a$, the signals which have been Fourier transformed at Fourier transform circuit 50$a$ to be separated for each subcarrier are complex multiplied by $H_1^*(\omega)$, which is the complex conjugate generated at complex conjugate section 62$a$, and at complex multiplier 63$b$, the signals which have been Fourier transformed at Fourier transform circuit 50$b$ to be separated for each subcarrier are complex multiplied by $H_2^*(\omega)$, which is the complex conjugate generated at complex conjugate section 62$b$.

Thereafter, the multiplication results at complex multipliers 63$a$, 63$b$ are combined for each subcarrier at wave combiner 64 to be provided to parallel-serial conversion circuit 70 as a diversity processed signal.

Assuming that the spectrum of a transmitted signal is $S(\omega)$, the spectrum of a received signal are $R_1(\omega)$, $R_2(\omega)$, the following equation are satisfied:

$$R_1(\omega) = S(\omega) \cdot H_1(\omega) + N_1$$

$$R_2(\omega) = S(\omega) \cdot H_2(\omega) + N_2$$

where $N_1$, $N_2$ represent thermal noise.

Assuming that the spectrum after diversity combination is $D(\omega)$, the following equation is satisfied:

$$D(\omega) = S(\omega) \cdot H_1(\omega) \cdot H_1^*(\omega) + N_1 \cdot H_1^*(\omega) + S(\omega) \cdot H_2(\omega) \cdot H_2^*(\omega) + N_2 \cdot H_2^*(\omega) = S(\omega) \cdot [|H_1(\omega)|^2 + |H_2(\omega)|^2] + N(\omega)$$

and it can be seen that the maximum ratio combination is obtained.

The diversity processed signals are applied to parallel-serial conversion circuit 70 where the signals diversity processed at diversity processing unit 60 are parallel-serial converted to generate I, Q signals in time series.

Thereafter, the I, Q signals generated at parallel-serial conversion circuit 70 are demodulated at demodulator 90 and are outputted as demodulated data.

As described above, in the diversity receiver having such a diversity processing unit as shown in FIG. 2, respective subcarrier signals of the OFDM modulated signal are generally separated as respective frequency components for demodulation using the Fourier transform. Additionally, two lines are provided from antennas 10a, 10b to Fourier transform circuits 50a, 50b, and diversity processing unit 60 performs diversity processing for each subcarrier using the signals separated for each subcarrier at Fourier transform circuits 50a, 50b.

Referring now to FIG. 3, there is shown another example of configuration of diversity processing unit 60 shown in FIG. 1, comprising propagation path characteristic estimating section 61a for estimating propagation path characteristic $H_1(\omega)$ of a first propagation path based on the signals which have been Fourier transformed at Fourier transform circuit 50a to be separated for each subcarrier and a known reference signal for estimating a propagation path characteristic which is periodically inserted into the signal transmitted from transmitter 1; propagation path characteristic estimating section 61b for estimating propagation path characteristic $H_2(\omega)$ of a second propagation path based on the signals which have been Fourier transformed at Fourier transform circuit 50b to be separated for each subcarrier and a known reference signal for estimating a propagation path characteristic which is periodically inserted into the signal transmitted from transmitter 1; wave amplitude characteristic comparator 65 for providing a selection signal for selecting a signal received through a propagation path exhibiting a high amplitude for each subcarrier based on propagation path characteristic $H_1(\omega)$ estimated at propagation path characteristic estimating section 61a and propagation path characteristic $H_2(\omega)$ estimated at propagation path characteristic estimating section 61b; and wave selector 66 serving as selecting means for receiving the signals provided from Fourier transform circuits 50a, 50b and selecting the signal received through the propagation path exhibiting a high amplitude from the signals provided from Fourier transform circuits 50a, 50b for each subcarrier based on the selection signal provided from wave amplitude characteristic comparator 65 to output the selected signal.

Since only a comparison is required between amplitudes for two lines in the diversity receiver having the diversity processing unit configured as mentioned above, it is also possible for an amplitude to be periodically measured for each subcarrier during transmission of normal data signals to make a comparison between reception two lines, thereby generating a selection signal.

Additionally, when such a diversity processing unit as shown in FIG. 3 is used, selective diversity may be performed for each subcarrier of an OFDM modulated signal.

Although a certain preferred embodiment of the present invention has been shown and described in detail, it should be understood that various changes and modifications may be made therein without departing from the scope of the appended claims.

What is claimed is:

1. A diversity receiver comprising:

two antennas for receiving a modulated signal transmitted from a transmitter;

two orthogonal detectors, each of said orthogonal detectors for converting the modulated signal received through one of said two antennas into an complex analogue baseband signal and outputting the converted signal;

two sets of sampling and quantizing means, each set of said sampling and quantizing means for sampling and quantizing the complex analogue baseband signal provided from one of said two orthogonal detectors;

two serial-parallel conversion circuits, each of said serial-parallel conversion circuits for serial-parallel converting the baseband signal sampled and quantized at one of said two sets of sampling and quantizing means;

two Fourier transform circuits, each of said Fourier transform circuits for Fourier transforming the baseband signal serial-parallel converted at one of said two serial-parallel conversion circuits to separate the modulated signal transmitted from the transmitter into signals for each subcarrier;

a diversity processing unit for performing optimal diversity processing for each subcarrier using two signals provided from said two Fourier transform circuits;

a parallel-serial conversion circuit for parallel-serial converting the signal diversity processed at said diversity processing unit to generate I, Q signals in time series; and a demodulator for demodulating the I, Q signals generated at said parallel-serial conversion circuit and outputting the demodulated signal as demodulated data.

2. The diversity receiver according to claim 1, wherein each of said two orthogonal detectors converts the modulated signal received through said antennas into two complex analogue baseband signals which are orthogonal to each other and outputting the converted signals, each of said two sets of sampling and quantizing means comprising first sampling and quantizing means for sampling and quantizing one of the analogue complex baseband signals provided from one of said orthogonal detectors to generate a sampled and quantized I signal and second sampling and quantizing means for sampling and quantizing the other of the analogue complex baseband signals provided from the one of said orthogonal detectors to generate a sampled and quantized Q signal.

3. The diversity receiver according to claim 1, wherein said diversity processing unit comprises:

two propagation path characteristic estimating sections, each of said propagation path characteristic estimating sections for estimating a propagation path characteristic of a propagation path to the transmitter based on the signals which have been Fourier transformed at one of said two Fourier transform circuits to be separated for each subcarrier and a known reference signal for estimating a propagation path characteristic which is periodically inserted into a signal transmitted from the transmitter;

two complex conjugate sections, each of said complex conjugate sections for generating a complex conjugate of the propagation path characteristic estimated at one of said two propagation path characteristic estimating sections;

two complex multipliers, each of said complex multipliers for complex multiplying the signals which have been Fourier transformed at one of said two Fourier transform circuits to be separated for each subcarrier by the complex conjugate generated at one of said two complex conjugate sections; and a wave combiner for combining the multiplication results at said two complex multipliers for each subcarrier and providing the combined result to said parallel-serial conversion circuit as a diversity processed signal.

4. The diversity receiver according to claim 1, wherein said diversity processing unit comprises:

two propagation path characteristic estimating sections, each of said propagation path characteristic estimating sections for estimating a propagation path characteristic of a propagation path to the transmitter based on the signals which have been Fourier transformed at one of said two Fourier transform circuits to be separated for each subcarrier and a known reference signal for estimating a propagation path characteristic which is periodically inserted into a signal transmitted from the transmitter;

a wave amplitude characteristic comparator for providing a selection signal for selecting a signal received through a propagation path exhibiting a high amplitude for each subcarrier based on the propagation path characteristics estimated at said two propagation path characteristic estimating sections; and selecting means for receiving the signals provided from said two Fourier transform circuits and selecting the signal received through the propagation path exhibiting a high amplitude from the signals provided from said two Fourier transform circuits for each subcarrier based on the selection signal provided from said wave amplitude characteristic comparator.

5. The diversity receiver according to claim 2, wherein said diversity processing unit comprises:

two propagation path characteristic estimating sections, each of said propagation path characteristic estimating sections for estimating a propagation path characteristic of a propagation path to the transmitter based on the signals which have been Fourier transformed at one of said two Fourier transform circuits to be separated for each subcarrier and a known reference signal for estimating a propagation path characteristic which is periodically inserted into a signal transmitted from the transmitter;

two complex conjugate sections, each of said complex conjugate sections for generating a complex conjugate of the propagation path characteristic estimated at one of said two propagation path characteristic estimating sections;

two complex multipliers, each of said complex multipliers for complex multiplying the signals which have been Fourier transformed at one of said two Fourier transform circuits to be separated for each subcarrier by the complex conjugate generated at one of said two complex conjugate sections; and a wave combiner for combining the multiplication results at said two complex multipliers for each subcarrier to provide the combined result to said parallel-serial conversion circuit as a diversity processed signal.

6. The diversity receiver according to claim 2, wherein said diversity processing unit comprises:

two propagation path characteristic estimating sections, each of said propagation path characteristic estimating sections for estimating a propagation path characteristic of a propagation path to the transmitter based on the signals which have been Fourier transformed at one of said two Fourier transform circuits to be separated for each subcarrier and a known reference signal for estimating a propagation path characteristic which is periodically inserted into a signal transmitted from the transmitter;

a wave amplitude characteristic comparator for providing a selection signal for selecting a signal received through a propagation path exhibiting a high amplitude for each subcarrier based on the propagation path characteristics estimated at said two propagation path characteristic estimating sections; and selecting means for receiving the signals provided from said two Fourier transform circuits and selecting the signal received through the propagation path exhibiting a high amplitude from the signals provided from said two Fourier transform circuits for each subcarrier based on the selection signal provided from said wave amplitude characteristic comparator.

7. The diversity receiver according to claim 2, wherein each of the first and second sampling and quantizing means comprises an A/D converter.

8. The diversity receiver according to claim 3, wherein each of the first and second sampling and quantizing means comprises an A/D converter.

9. The diversity receiver according to claim 4, wherein each of the first and second sampling and quantizing means comprises an A/D converter.

10. The diversity receiver according to claim 5, wherein each of the first and second sampling and quantizing means comprises an A/D converter.

11. The diversity receiver according to claim 6, wherein each of the first and second sampling and quantizing means comprises an A/D converter.

* * * * *